Patented July 4, 1939

2,164,459

UNITED STATES PATENT OFFICE 2,164,459

TREATMENT OF WELLS

Harvey T. Kennedy, Forest Hills, Pa., assignor to Gulf Research & Development Company, Pittsburgh, Pa., a corporation of Delaware No Drawing. Application May 28, 1937, Serial No. 145,386

8 Claims. (Cl. 166—21)

This invention or discovery relates to treatment of wells; and it comprises a method of shutting off flow of water in wells which are producing oil and water, without affecting flow of oil, which comprises forcing under pressure into strata surrounding the well a suspension of an emulsifying agent in a substantially non-aqueous liquid, whereby to cause emulsification of water present in the oil-bearing portions of the strata, releasing pressure whereby the emulsion of water drains into the well, removing the emulsified water from the well, and then injecting into the well a fluent material inert to oil but adapted to form a plugging precipitate in the presence of water; all as more fully hereinafter set forth and as claimed.

Oil wells often produce water as well as oil. The well penetrates various porous strata of rock or sand, some of which contain oil and some of which contain water. Sometimes the oil and water flow into the well through the same stratum. When a well produces much water it is essential to shut off this flow. In the past this has been done mostly by casing off the water-bearing stratum, by plastering the walls with cement or by other mechanical means. There have recently been developed methods for shutting off the water flow by injecting plugging matter into the pores, crevices etc. of the formations. That is, there is injected into the well a solution or suspension of various agents which on contact or admixture with the water in the water-bearing formations form a precipitate in the wet pores, thereby shutting off the water flow to a greater or less degree. The sealing agent in most cases necessarily enters both the oil strata and the water strata, but a sealing material is selected which does not form a precipitate or deposit in the presence of (dry) oil; or at least forms a deposit which is more or less soluble in oil.

If the oil strata and the water strata are separate and sharply demarcated, the oil sands containing only oil, these sealing treatments may be quite effective. But in many cases the oil stratum is not free of water. There is the danger of precipitation of sealing agent in the oil sand, which is very undesirable.

Water is sometimes found already existing in the oil sands when the field is drilled. Or it may have entered the oil sand from higher or lower sands at some stage during production; for instance, when the well is shut down for repairs and a hydrostatic head allowed to build up in the well. In any case, upon attempting to shut off the water in the water sand, the water in the oil sand may react with the plugging material injected into the sands, and form obstructing precipitates in the oil sand. Sometimes substantially complete obstruction takes place.

An object of the present invention is to prevent any possibility of precipitation or deposition of sealing agents in the oil sand, in injection sealing methods.

I have discovered a method by which this undesirable precipitation may be eliminated. The principle of the invention is to inject into the well, prior to injection of water shutoff agents, a material adapted to collect any water present in the oil sands, in the form of an emulsion, and then cause this emulsion to be flushed out from the oil sand into the well and replaced with dry oil; all prior to injection of the sealing agent. There is a wide range of materials which can be used for emulsifying and removing the water. Most of the well known emulsifiers are effective. In particular, oil soluble emulsifying agents or emulsifying agents which may be easily dispersed in oil to form colloidal solutions are effective, especially when such emulsifying agents are not precipitated or their emulsifying properties destroyed by the brines occurring in the producing formations to be treated. When the water which is to be removed in the form of an emulsion is fresh water, it is of no great moment that the emulsifying agent employed should be stable in the presence of brines, but when the waters to be removed contain appreciable amounts of Na, Mg, and Ca salts, I find it advantageous to employ as an emulsifying agent a salt of a sulfated alcohol of high molecular weight and more particularly, the salts obtained by the neutralization of the mono-sulfuric esters (half esters) of lauryl, cetyl, or stearyl alcohols with a substituted amine, such as di-butyl-amine. Other emulsifying agents which are effective in brines are the alkali and amine salts of oil-soluble mineral oil sulfonates stable in the presence of calcium and magnesium salts. When fresh water is encountered any of the foregoing emulsifying agents may be used and also ordinary fatty acid soaps including ammonium soaps, substituted amine soaps and soaps of sulfonated fatty acids. Alkali salts of sulfated high molecular weight aliphatic alcohols and certain alkali salts of sulfo derivatives of fatty amides are also effective. As an example of the latter type of compound, I have found the sodium salt of oleic N-methyl tauride useful. It is commercially available as a detergent and wetting agent.

The emulsifying agent may be of the type which forms, with water in the rock formation, a water-in-oil emulsion or it may be one which forms an oil-in-water emulsion. The agent is usually injected in a liquid vehicle, conveniently oil. Any other suitable substantially non-aqueous medium can be employed but oil is cheap and readily available. Usually, for the sake of economy, the emulsifying agent is employed in rather dilute solutions. When fresh water is encountered any of the so-called soluble cutting oils can be used as the injection medium. They emulsify readily and form stable suspensions. Soluble cutting oils usually comprise a mineral oil, a sulfonated oil (e. g. sulfonated castor oil) an alkali and some water; usually about 5 to 8 per cent.

Upon treating the sands according to this invention, prior to injection of the sealing agent, to displace all or most of the water from the oil sand, then, upon injection of the sealing agent, there is no obstruction of the oil sand. The oil sand produces as freely as before.

Considering the application of the process to a well, in which the oil sand has, or is thought to have an appreciable water content; first water standing in the well is removed as completely as possible by pumping, bailing or swabbing. As much flow from the sands into the well as possible is allowed in order to remove such water as will be replaced by crude oil flowing toward the well from remote points. A liquid suspension or solution of a suitable emulsifier is now injected into the well and pressure applied to force it a considerable distance into the sand. A solution of 99 parts mineral oil and 1 part di-butyl-ammonium-stearyl-sulfate, $$C_{18}H_{37}SO_4H.NH(C_4H_9)_2$$

by volume, is especially useful when brines high in calcium and magnesium content are encountered. A solution of 20 parts soluble cutting oil and 80 parts mineral oil, by volume, is useful when fresh water or weak brines are encountered. The distance is determined by the expected distance of injection of the water shutoff reagent, and is somewhat in excess of this distance in order to insure that none of the water shutoff agent will encounter water in the oil sand. The pressure is then released, whereupon emulsified water and oil enter the well from the sand. These liquids are removed by pumping, etc. The water in the oil sand is in effect replaced by oil flowing from parts of the formation more remote from the well.

In the next step there is injected into the well a fluent sealing agent of a type which produces an obstructing mass of some sort on admixture with water or brine. For example, liquid silicon tetrachloride may be injected (Kennedy and Lawton Patent 2,019,908) which, by hydrolysis, forms an insoluble hydrated silica deposit in the wet formation. The water formation is thereby effectively sealed. Ordinarily the agent enters both the water and the oil sands but possibility of plugging the oil sands is obviated. Some of the chemical used to treat the oil sands for removal of water finds its way into water sands, but it is removed and replaced by water during the step when the well is allowed to flow to remove the emulsion from the oil sand. The water sand is, prior to injection of the sealing agent, in the same condition as it was before treatment with the emulsifier.

Great care should be taken in the interval between the removal of water from the oil sand and the treatment of the well with the plugging agent, in order to prevent water re-entering the sand from the well. In the case of a pumping well, this is accomplished by pumping at such rate that the liquid head in the well does not build up sufficiently to equal the formation pressure. In the case of a flowing well, this prevention may be accomplished by pumping dry (water-free) oil down the casing and producing this oil together with accumulated water from the tubing, the tubing being set on bottom. In such operation care should be taken that sufficient back pressure is not placed on the tubing to cause flow from the well to the producing sand. In the case of a well not provided with tubing the flow of water into the oil sand in this interval can be prevented by bailing out the water as fast as it enters the well.

My process is useful in connection with all types of water shutoff proceedings which involve injection of fluids which cause precipitates by chemical or physical actions of the water in the sand or the salts dissolved in the water. The sealing material may be a substance which produces an insoluble deposit by hydrolysis; e. g. organic silicates disclosed and claimed in my copending application, Serial No. 137,585, filed April 17, 1937, or silicon tetrachloride (the acknowledged Kennedy and Lawton patent); the substance being injected by itself or in solution in a non-aqueous solvent. It may be a solution which reacts with the dissolved constituents of brine (calcium chloride, etc.) to yield an insoluble precipitate (e. g. an aqueous suspension of soap). Many other procedures involving chemical actions are suitable. Optionally, the sealing agent may be a suspension of solid particles which simply undergo a physical change on contact with water; e. g. a bentonite suspension in alcohol.

While, as stated, the emulsifying agent is usually injected as a solution, those emulsifying agents which are liquid can be injected alone in liquid form if desired, in which case the agent promotes emulsification of the water in the formation with the oil, and thus enables the water to be flushed out.

As stated, oil-soluble emulsifying agents which are neither precipitated nor their emulsifying powers destroyed by contact with brines are especially convenient for use in my process. Examples of such emulsifying agents are as follows:

Di-butyl ammonium lauryl sulfate
$$C_{12}H_{25}SO_4H.NH(C_4H_9)_2$$

Di-butyl ammonium cetyl sulfate
$$C_{16}H_{33}SO_4H.NH(C_4H_9)_2$$

Substituted amine salts of mixed mono-sulfuric esters derived by treating with sulfuric acid a mixture of primary normal aliphatic alcohols of between 12 and 18 carbon atoms.

When fresh waters are encountered cutting oils and cutting oil bases are convenient for use in my process.

Examples of cutting oils are as follows:

Per cent by weight
1. Potash soap_____ 42
   Olein _____ 10
   Alcohol _____ 3
   Mineral oil_____ 45

2. Sodium soap of petroleum acid sludge____ 5.0
   Sulfonated oleic acid_____ 2.5
   Denatured alcohol_____ 1.2
   Mineral oil_____ 91.3
   Caustic soda solution, 20 per cent strength 0.5

3. Mineral oil_____ 88.1
   Oleic acid_____ 8.0
   Triethanolamine_____ 3.9

An example of a suitable cutting oil concentrate or base is a mixture of sodium soap of petroleum acid sludge, 5 parts by weight, sulfonated oleic acid 2.5 parts, and denatured alcohol 1.2 parts.

For use, this concentrate may be admixed with 90 parts crude oil or more.

What I claim is:

1. In shutting off water in oil wells having porous strata producing oil and producing water, the process which comprises forcing under pressure into the well and strata a dispersion of an emulsifying agent in a substantially non-aqueous liquid, whereby water in the oil-producing strata is emulsified, releasing pressure to cause flushing of the emulsified water into the well, removing liquids from the well, and then injecting into the well and strata a fluent material inert to oil and adapted to form a plugging precipitate in the presence of water.

2. In shutting off water in oil wells by injection into surrounding formations of materials adapted to form a plugging precipitate on contact with water or brine, the improvement which comprises the steps of injecting into the well and formations under pressure an emulsifying agent adapted to emulsify water in the presence of oil, and releasing pressure to cause flushing of water from the formations into the well, prior to injecting the sealing material.

3. The process of claim 1 wherein the dispersion of emulsifying agent in non-aqueous liquid is a cutting oil dissolved in petroleum oil.

4. The matter of claim 2 wherein the emulsifying agent is a sulfonated oil soap.

5. The matter of claim 2 wherein the emulsifying agent is a salt obtained by the neutralization of a mono-sulfuric ester of a high molecular weight alcohol with a substituted amine.

6. The matter of claim 2 wherein the emulsifying agent is a salt obtained by the neutralization of a mono-sulfuric ester of a primary normal aliphatic alcohol of between 12 and 18 carbon atoms with di-butyl-amine.

7. The matter of claim 2 wherein the emulsifying agent is di-butyl-ammonium-stearyl-sulfate.

8. In shutting off water in oil wells having porous strata producing oil and producing a brine containing calcium, magnesium or sodium salts, the process which comprises injecting into the strata under pressure a liquid dispersion of an emulsifying agent selected from the class consisting of (1) salts of sulfated high molecular weight alcohols, (2) salts of sulfo derivatives of fatty amides and (3) salts of oil-soluble mineral oil sulfonates, the agent being further characterized by remaining in solution in the presence of calcium, magnesium and sodium salts and preserving its emulsifying properties in the presence of such calcium, magnesium and sodium salts; whereby the brine in the oil-producing strata is emulsified; releasing pressure to cause flushing of the emulsified brine into the well; removing liquids from the well; and injecting into the well a fluent material inert to oil and adapted to form a plugging precipitate in the presence of water.

HARVEY T. KENNEDY.